United States Patent [19]

Enning et al.

[11] Patent Number: 5,382,071
[45] Date of Patent: Jan. 17, 1995

[54] MOTOR VEHICLE WITH A CENTRAL PILLAR CONSTITUTED BY AN EXTRUDED SECTION

[75] Inventors: Norbert Enning, Denkendorf; Heinrich Timm, Ingolstadt, both of Germany

[73] Assignee: Audi AG, Ingolstadt, Germany

[21] Appl. No.: 983,525

[22] PCT Filed: Nov. 29, 1991

[86] PCT No.: PCT/EP91/02263

§ 371 Date: Mar. 1, 1993

§ 102(e) Date: Mar. 1, 1993

[87] PCT Pub. No.: WO92/11157

PCT Pub. Date: Jul. 9, 1992

[30] Foreign Application Priority Data

Dec. 20, 1990 [DE] Germany .................... 4041038

[51] Int. Cl.⁶ ............................................. B62D 25/00
[52] U.S. Cl. ................................. 296/203; 296/188; 296/205; 296/209
[58] Field of Search ............. 296/185, 188, 193, 202, 296/203, 209, 205

[56] References Cited

U.S. PATENT DOCUMENTS

| | | | |
|---|---|---|---|
| 2,539,050 | 1/1951 | Begg | 296/28 |
| 4,552,400 | 11/1985 | Harasaki et al. | 296/185 |
| 4,618,163 | 10/1986 | Hasler et al. | |
| 5,242,209 | 9/1993 | Yamauchi | 296/209 X |
| 5,246,264 | 9/1993 | Yoshii | 296/209 X |

FOREIGN PATENT DOCUMENTS

| | | |
|---|---|---|
| 0146716 | 4/1985 | European Pat. Off. |
| 0847853 | 10/1939 | France . |
| 0983890 | 1/1951 | France . |
| 2333691 | 1/1977 | France . |
| 2164705 | 10/1972 | Germany . |
| 8717616 | 3/1989 | Germany . |
| 3726079 | 5/1989 | Germany . |
| 3918280 | 2/1990 | Germany . |
| 3925170 | 4/1990 | Germany . |
| 4087888 | 3/1992 | Japan ............... 296/209 |
| 0212963 | 4/1941 | Switzerland . |
| 0596984 | 1/1948 | United Kingdom . |
| 9004534 | 3/1990 | United Kingdom . |

*Primary Examiner*—Joseph Pape
*Attorney, Agent, or Firm*—Jacques M. Dulin

[57] ABSTRACT

A center pillar in a motor vehicle constructed of two light metal extruded sections including a first extruded section having one vertical side cut at an acute angled α over its length and a second extruded section of a uniform cross section. The cut side of the first extruded section is mated to a vertical side edge of the second extruded section in such a way to produce a center pillar having a gradually tapering thickness from bottom to top. The first extruded section includes a bend region at a lower terminal end portion thereof which diverges from the first extruded section and which is cut at an acute angle for smooth transitional connection to a bottom disposed lengthwise connecting member. A plate member is provided for covering the gap created by the divergence of the first extruded section relative the second extruded section.

8 Claims, 1 Drawing Sheet

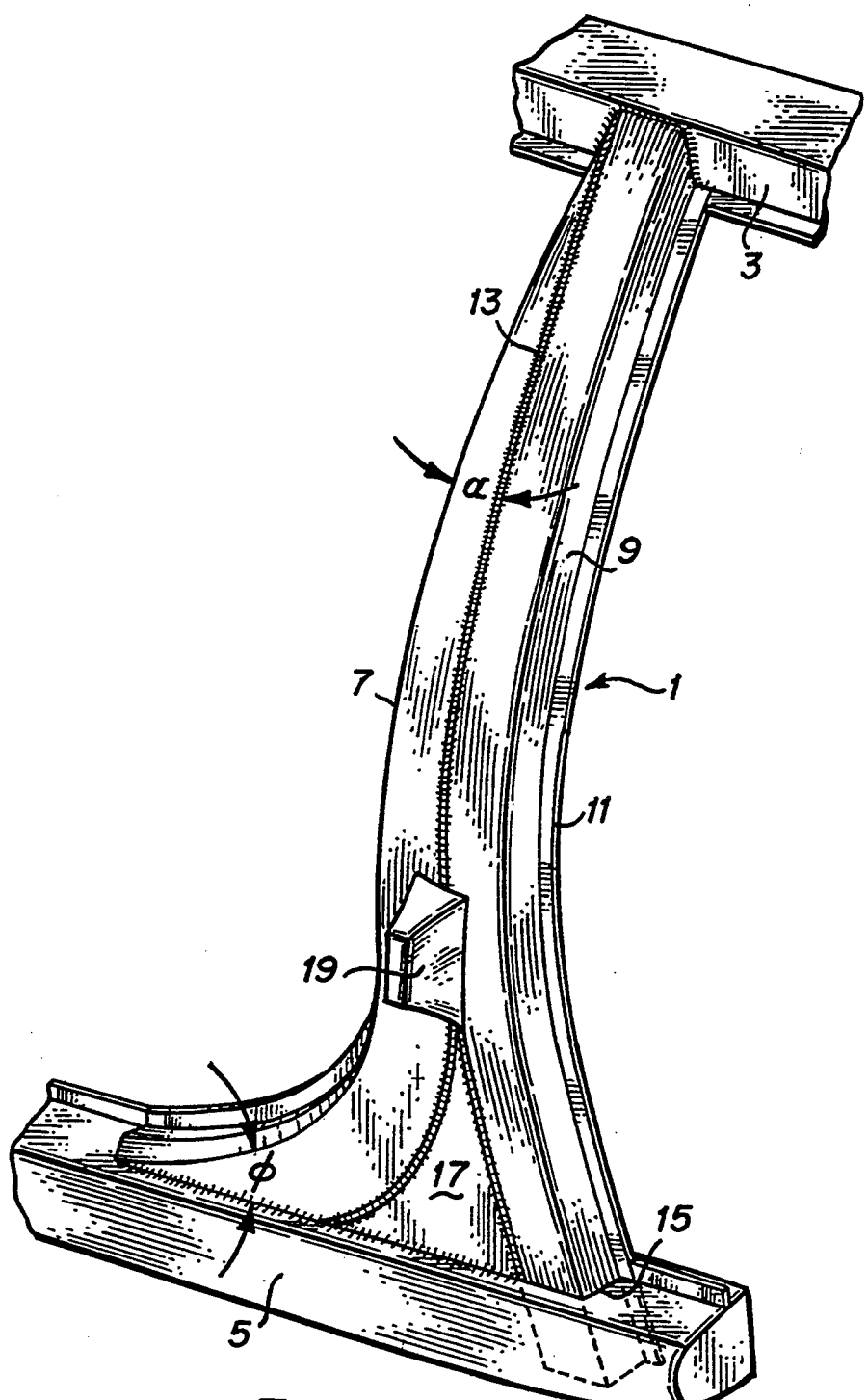
Fig_1 the bill 5,382,071

MOTOR VEHICLE WITH A CENTRAL PILLAR CONSTITUTED BY AN EXTRUDED SECTION

FIELD

The invention relates to motor vehicle body structure, and more particularly to an extruded light metal center pillar construction in a motor vehicle body which is specially configured for improved force distribution and rigidity.

BACKGROUND

In the conventional motor vehicle body construction, a vertically oriented center pillar is provided for joining a roof stringer to a lower lengthwise member of the vehicle, such as, for example, a floor sill member. Since the center pillar takes the brunt of the force impact experienced in a side collision, it is desirable to configure the center pillar with an enclosed cross section for rigidity and contoured connecting end portions for better transfer of energy and force distribution from the center pillar to the adjoining lengthwise members of the vehicle.

Conventional center pillar constructions having smoothly curving transitional end portions fabricated from sheet metal stampings are known in the prior art. For example, German patent document DE-OS 21 64 705 discloses a curved transition between a center pillar to a lengthwise bottom door sill member made from pieces of sheet metal.

German patent document DE-GM 87 17 616 discloses another solution wherein a section is made from a single sheet metal piece. This patent document describes a door frame in a utility vehicle, whereby the section forming a vertical center pillar member is split at its lower end region where it joins a horizontal member and one of the two resulting split terminal end regions is molded for flush connection to the horizontal frame member. A disadvantage with this type of connection is that split reduces the strength of the connection, especially if a segment is removed thereby, as in the example according to DE-GM 87 17 616. Further, the split connection according to this process requires additional labor expense.

A recent trend in the design and fabrication motor vehicle bodies has seen a shift away from the reliance on sheet metal as a primary construction material for many frame elements in favor of frame elements formed from extruded light metal alloys in view of the advantages of weight reduction and ease of implementation in the manufacturing process afforded by the new materials. For example, extruded light metal center pillars for joining a roof stringer to a floor sill member are well known in the art. However, in view of the limitations associated with the extrusion process, a center pillar formed from as an extrusion typically has only a uniform cross section from top end to bottom end. This poses a problem where it is desirable to selectively vary the cross-sectional dimension of center pillar for additional rigidity where it is needed most. Further, in the case of an extruded light metal center pillar construction, it is difficult to incorporate smoothly curving transition end regions to smoothly transfer force and energy to adjoining frame members.

Accordingly, there is a definite need in the art for a center pillar construction formed from extruded light metals which is of low cost to implement in the manufacture process of a motor vehicle body and which provides good force transfer characteristics to adjacently connected frame members and which also increases the overall rigidity of the vehicle frame.

THE INVENTION

OBJECTS

It is a principle object of the present invention to provide an improved center pillar construction for a motor vehicle body fabricated from two extruded light metal sections, each having a particular cross section and which are joined together to form a single pillar member having a specially configured cross section over a lower portion of the pillar member to provide improved force transfer to the bottom connected longitudinal frame member and which provides improved overall frame rigidity.

It is another object of the invention to provide an improved center pillar construction formed from extruded light metal sections of the type described which is of low cost and is easy to implement in existing manufacturing processes for motor vehicle body construction.

Other and further objects will become apparent from the following detailed description, drawing and appended claims.

DRAWINGS

FIG. 1 is an isometric view of a center pillar of a motor vehicle body constructed in accordance with one embodiment of the present invention.

SUMMARY

The proposed center pillar of the present invention comprises two extrusions, arranged one behind the other as seen in the lengthwise direction of the vehicle. The first of the two extrusions is cut at an acute angle $\alpha$ along its length and is mated to the second extrusion in such a way that the thickness of the resulting center pillar formed from the combination of the two extrusions tapers towards its top end portion. The tapering formation of the center pillar, which is familiar in the case of stamped sheet metal structures, ensures that there is a good transitional flow of force from the center pillar into the lower connected lengthwise member of the vehicle, despite the fact that the center pillar of the invention is formed through the use of extruded sections rather than the traditional sheet metal stampings. Furthermore, the center pillar is strengthened in its lower region where it joins the lengthwise member of the vehicle. The lower region is typically subjected to the greatest force in event of a side collision.

To produce the tapering center pillar according to the invention, the side of the first extrusion is trimmed or cut out at an acute angle $\alpha$ over a large portion of its length. The acute angled cut surface of the first extrusion is then joined to a vertical side of the second extrusion. The two extrusions are preferably joined together by welding along their region of contact.

An advantage of forming a center pillar from two extrusions, as compared to a center pillar formed from two or more sheet metal stampings, is that only a slight investment expense is required.

The proposed center pillar of the present invention has a further advantage in that only alteration of one of the two extrusions is necessary in the event of a desired technical or optical modification, while the second extrusion having a uniform cross section can be used without change. In this way, it is also possible to retain one of the two extrusions forming the center pillar in different models of the vehicle. The desired cosmetic differences between different vehicle models can then be achieved by different configurations for the other extrusions. Depending on the cutout of the first extrusion, it is possible to produce a very broad or very slender tapering center pillar. For example, if the cutout for the first extrusion has an extreme acute angle such that the surface of the cutout spans substantially the entire distance between the roof stringer and the lower lengthwise member, a very slender center pillar is achieved. For the example where the cutout angle is larger, the two extrusions will diverge from each other at some point such that the gap formed between them must be bridged or covered by suitable means. A suitable cover means may comprise, for example, a plate of light metal sheet which may be welded to each of the two extrusions.

The extrusions themselves may also form a portion of the outer skin of the vehicle, since by way of the extrusion process, it is possible to produce light metals or light metal alloys which have a very smooth surface of finishing quality. Since the extruded sections are preferably joined together by welding, it is desirable to machine the outwardly exposed weld areas or, in the alternative cover the weld areas with an appropriate cladding. However, solutions are also conceivable in which the center pillar does not form the outer skin, but rather is covered by the two side passenger doors, so that machining of the weld areas is unnecessary.

Each extruded section may also have a flange or flanges disposed along side areas thereof to accommodate door and window seals. The fastening of the center pillar to the roof stringer and bottom lengthwise sill member may be done by welding or by a detachable joint. For fastening by detachable joint, it is possible to mount the center pillar during a late stage in the assembly of the vehicle in order to permit unobstructed side access to a robotic machine or related automated handling equipment for the insertion and installation of large pieces of interior components to the vehicle passenger compartment.

It is particularly advantageous if the terminal region of at least one extruded section at the lengthwise member terminates in a smoothly curved bend and is cut at an acute angle for fitting and fastening to the bottom lengthwise member. This makes it possible to achieve an especially favorable flow of force from the center pillar to the bottom connected lengthwise member.

According to one embodiment of the invention, the bottom terminal end region of at least one of the extrusions penetrates the top wall of the lower lengthwise member at a right angle and is fastened to the bottom wall of the lengthwise member. This ensures greater strength and rigidity since the extrusion is supported or braced by substantially the entire width or cross section of the lower lengthwise member. If, on the other hand, the connection is made by welding the bottom terminal end of the one extrusion to the top wall of the lower lengthwise member, the resulting connection would be weaker since there is no bracing support for the pillar member and the welding reduces the strength of the usual light metal extruded section along the region immediately adjacent the weld.

DETAILED DESCRIPTION OF THE PREFERRED BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

FIG. 1 shows in perspective view the center pillar 1 of a motor vehicle body constructed in accordance with one embodiment of the present invention. The upper end of the center pillar 1 is connected, preferably by welding, to a roof stringer 3 (only a portion of which is shown) of the motor vehicle body. The lower region of the center pillar 1 is received by a bottom most lengthwise member 5, commonly known as a door sill.

As FIG. 1 clearly shows, the center pillar 1 comprises a first frame extrusion or extruded section 7 and a second frame extrusion or extruded section 9. Both extruded sections 7, 9 preferably comprise a light metal alloy.

In the preferred embodiment, the second extruded section does not require machining and is merely cut to a desired length and bent in order to fit between the roof stringer 3 and lengthwise member 5. A flange 11 is preferably formed from the same piece as the extruded section 9 in order to accommodate a sealing element.

The first extruded section 7 is cut at the acute angle α over approximately half its length. The resulting acute angled cut surface 13 is mated to the second extruded section 9. The two extruded sections are then joined together, preferably by welding, to form the tapered center pillar 1 as shown. FIG. 1 also shows a console 19 for the front door catch bolt (not shown) positioned along a lower portion of the adjoining cut surface or weld 13.

The connection of both the first extruded section 7 and the second extruded section 9 to the bottom lengthwise member or floor sill 5 may be accomplished in different ways. In the preferred embodiment, a curved transition region is created to achieve a good flow of force from the central pillar 1 to the lengthwise member 5. In this embodiment the bottom terminal region of the first extruded section 7 which connects to the lengthwise member 5 is curved and is cut at an acute angle α along its bottom edge in order to firmly brace against the upper surface of the lengthwise member 5. The extruded section 7 and the lengthwise member 5 are preferably joined together by welding.

The second extruded section 9 is received through a slot or opening 15 in the upper portion of the lengthwise member 5 and extends downwardly to the bottom inside wall of the lengthwise member 5. The terminal bottom end of the extruded section 9 is welded to the lengthwise member at the bottom or end wall of the opening 15. Connection in this way ensures great strength since the bottom end region of the extruded section 9 is effectively supported or braced by the entire width of the bottom lengthwise member 5. A sheet of light metal 17 is preferably included to cover the roughly triangular open space between the lower regions of the first extruded section 7 and the second extruded section 9. The metal sheet covering 17 also provides strength to this juncture between the center pillar 1 to the bottom lengthwise member 5 since side-to-side flexure of the extrusions 7, 9 is prevented.

Of course, it is also possible within the context of the invention to connect both extruded sections of the center pillar by forming a second upper curved junction in the area of the roof stringer 3 in addition to the curved juncture of the pillar in the area of the lengthwise member 5. In an alternative embodiment and depending on the structural possibilities available, either one of the extruded sections 7, 9 can be connected at an obtuse angle or passed through an opening in the receiving structural chassis member.

It should be understood that various modifications within the scope of this invention can be made by one of ordinary skill in the art without departing from the spirit thereof. We therefore wish our invention to be defined by the scope of the appended claims as broadly as the prior art will permit, and in view of the specification if need be.

We claim:

1. A center pillar in a motor vehicle body having an upper end portion which is joined to a roof stringer and a lower end portion which is joined to a lower lengthwise member comprising in operative combination:
   a) a pair of vertically oriented extruded sections including a first extruded section having at least one vertical side surface cut at an angle over a substantial length thereof, and a second extruded section having a uniform cross section;
   b) said cut vertical side surface of said first extruded section is joined to a vertical side surface of said second extruded section to form a center pillar which tapers at an upper end portion thereof; and
   c) at least one of said extruded sections includes a smoothly curved bottom end region which diverges away from the other of said extruded sections and is cut at an angle along a bottom terminal end thereof to fit against and join to said lower lengthwise member.

2. A center pillar in a motor vehicle body as in claim 1 wherein:
   a) said smoothly curved end bottom region is provided to said first extruded section; and
   b) said second extruded section includes a bottom end region which is received at a right angle through a slot in said lower lengthwise member, said slot having a depth dimension spanning substantially the cross sectional width of said lower lengthwise member, and said bottom end region of said second extruded section having a terminal end secured to a bottom portion of said lower lengthwise member.

3. A center pillar in a motor vehicle body as in claim 1 which includes a plate member secured to both of said extruded sections for covering a gap region formed by a divergence of said curved bottom end region of said first extruded section from said second extruded section.

4. A center pillar in a motor vehicle body as in claim 2 which includes a plate member secured to both of said extruded sections for covering a gap region formed by a divergence of said curved bottom end region of said first extruded section from said second extruded section.

5. A center pillar in a motor vehicle body as in claim 3 wherein each of said extruded sections includes a flange member for fitting a sealing element thereon.

6. A center pillar in a motor vehicle body as in claim 4 wherein each of said extruded sections includes a flange member for fitting a sealing element thereon.

7. A method for the manufacture of a center pillar in a motor vehicle body from extruded sections which provides improved rigidity and force distribution characteristics, said method comprising the steps in operative sequence of:
   a) providing a first and second extruded light metal section each having a vertical length sufficient to connect a roof stringer to a lower lengthwise member;
   b) cutting a vertical side surface of said first extruded section at an acute angle over a substantial length thereof;
   c) welding the cut vertical side surface of said first extruded section to a vertical side surface of said second extruded section to form a center pillar which tapers at an upper end portion thereof;
   d) bending a bottom end region of said first extruded section in a direction away from said second extruded section and cutting a terminal end thereof to form a smooth curve transition for connection to a lower lengthwise member.

8. A method for the manufacture of a center pillar in a motor vehicle body from extruded sections as in claim 7 which further includes:
   a) covering a gap formed between said first extruded section, said second extruded sections and said lower lengthwise member by a generally triangular plate member welded along a perimeter boundary of said gap.

* * * * *